April 30, 1940.  Y. SEKELLA  2,199,349
ENGINE STARTER GEARING
Filed July 8, 1938     3 Sheets-Sheet 1
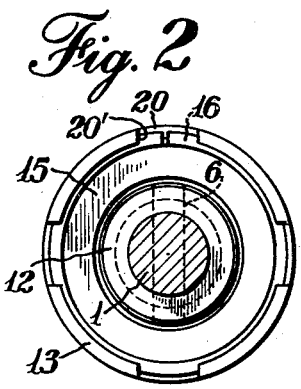
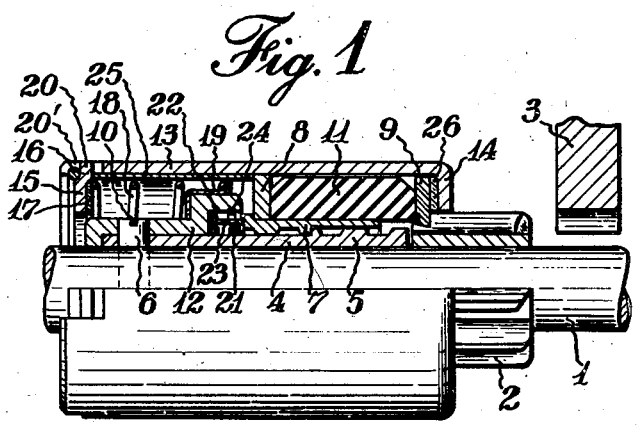
INVENTOR.
Youston Sekella

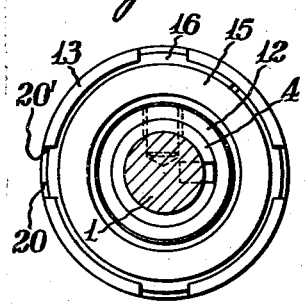
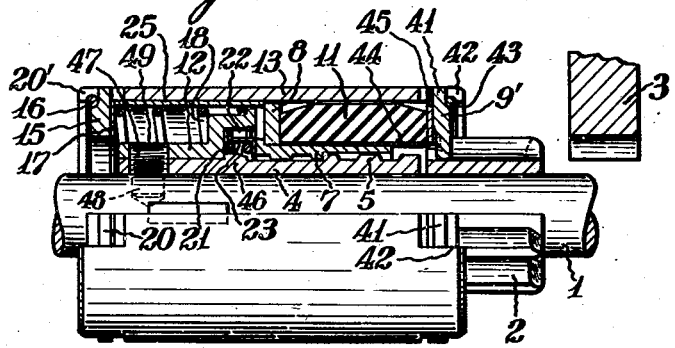
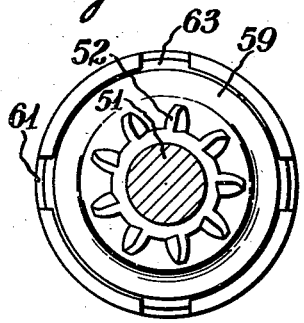
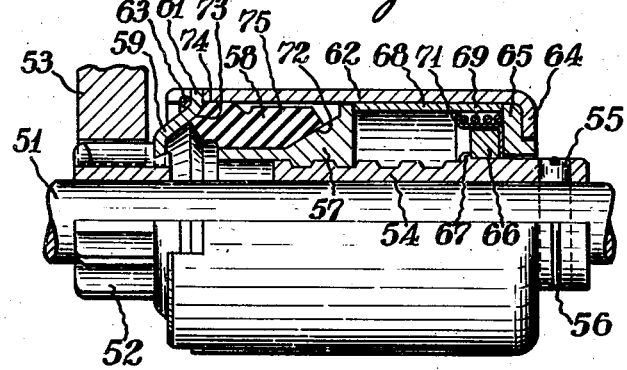

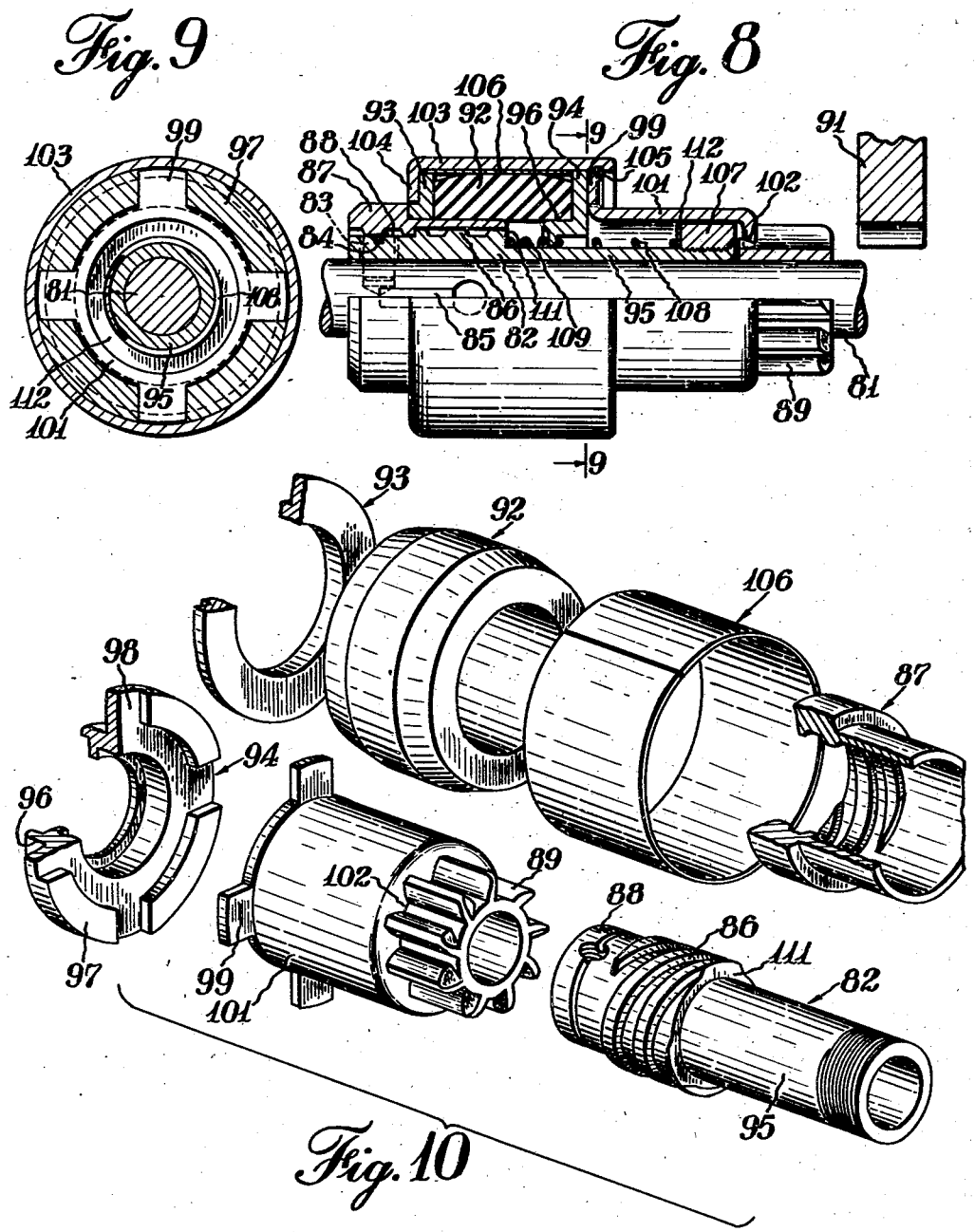

Patented Apr. 30, 1940

2,199,349

UNITED STATES PATENT OFFICE 2,199,349

ENGINE STARTER GEARING

Youston Sekella, Elmira Heights, N. Y., assignor to Bendix Aviation Corporation, South Bend, Ind., a corporation of Delaware Application July 8, 1938, Serial No. 218,156

11 Claims. (Cl. 74—7)

The present invention relates to engine starter gearing and more particularly to a yielding driving connection of the automatically engaging and disengaging type for connecting a starting motor with a member of the engine to be started.

It is an object of the present invention to provide a novel engine starter drive which is efficient and reliable in operation while being simple and economical in construction.

It is another object to provide such a device which is completely self-contained and enclosed against the entry of foreign matter.

It is a further object to provide such a device incorporating a yielding driving connection comprising a member of elastically deformable material which is arranged to yield both torsionally and compressively.

It is another object to provide such a device in which the elastic member is in the form of a cylindrical block of rubber or the like, with special provisions for preventing jamming or sticking.

It is another object to provide such a device in which the meshing position of the pinion is accurately defined irrespective of load conditions.

It is another object to provide such a device in which the torque is transmitted frictionally through the elastic member acting as a member of a friction clutch which is automatically tightened as the torque is applied thereto.

It is a further object to provide such a device incorporating a self-contained anti-drift mechanism for normally retaining the gearing in disengaged position.

It is another object to provide such a device incorporating a self-contained rebound check for preventing the gearing from bounding back and striking the engine member after being thrown out of engagement therewith.

It is another object to provide such a device incorporating provisions whereby the disengagement of the drive connection may be delayed or prevented as long as the starting motor remains energized.

Further objects and advantages will be apparent from the following description taken in connection with the accompanying drawings in which:

Fig. 1 is a side elevation partly in section of a preferred embodiment of the invention;

Fig. 2 is an end view thereof;

Fig. 3 is a view similar to Fig. 1 showing the parts in operative position;

Fig. 4 is a view similar to Fig. 1 of a second embodiment of the invention;

Fig. 5 is an end view thereof;

Fig. 6 is a side elevation partly in section of a third embodiment of the invention, showing the parts in driving position;

Fig. 7 is an end view thereof;

Fig. 8 is a side elevation partly in section of a fourth embodiment of the invention;

Fig. 9 is an end view thereof; and

Fig. 10 is a detail view in perspective of various elements of the drive structure illustrated in Fig. 8, certain of the parts thereof being broken away.

In Fig. 1 of the drawings there is illustrated a power shaft 1 which may be the extended armature shaft of a starting motor, not illustrated. A driven member in the form of a pinion 2 is freely journalled on the power shaft for movement into and out of engagement with a member such as a flywheel gear 3 of an engine to be started. Means for automatically traversing the pinion into engagement with the engine gear responsive to acceleration of the power shaft 1 are provided comprising a hollow shaft 4 threaded adjacent one end as indicated at 5 and having its opposite end smooth and anchored to the power shaft by suitable means such as a pin 6 traversing said shafts.

A driving member in the form of a nut 7 is mounted on the threaded end 5 of the hollow screw shaft 4 so as to be automatically traversed along the shaft by relative rotation therebetween. Means for transmitting longitudinal movement of the nut 7 to the pinion 2 in a direction to mesh the pinion is provided in the form of flange members 8 and 9 suitably affixed to the nut and pinion respectively, and a yielding transmission member in the form of a cylindrical block 11 of elastically deformable material such as rubber loosely mounted on the nut 7 and engaging at its ends the flanges 8 and 9. The ends of block 11 are preferably tapered or beveled as illustrated in order to eliminate any tendency for the block to stick or jam when compressed and subjected to torque.

Means for limiting the engaging movement of the pinion is provided in the form of a stop member 12 anchored to the power shaft 1 by means of the pin 6, a barrel member 13 having an inturned flange 14 acting as a stop for the flange 9 of the pinion, and a thrust ring 15 retained in the opposite end of the barrel 13 by suitable means such as a split ring 16. A friction thrust washer 17 may be interposed between the stop member 12 and thrust ring 15 to form a frictional connection therebetween when the parts are in operative position as illustrated in Fig. 3. The thrust ring 15 is preferably splined in the end of the barrel 13 as by means of lugs 20 extending radially from said thrust ring into slots 20' in the end of the barrel. The anchor pin 6 is retained by suitable means such as a split ring 10 seated in a circumferential groove in said stop member and pin.

Means normally maintaining the parts in idle position as illustrated in Fig. 1 is provided in the form of a spring anti-drift member 18 mounted in the barrel 13 bearing at one end against the thrust washer 17 and at the other end against a thimble 19 seated on the stop member 12. A re-entry spring 21 is provided preferably seated in a recess 22 in the stop member 12 and causing a thimble 23 slidably mounted in said recess to engage the end of the nut 7 and urge it into initial engagement with the threads 5 of shaft 4. The thimble 23 is retained in the recess 22 by suitable means such as a split ring 24 which limits the expansion of the re-entry spring 21.

The normal position of the flange 8 fixed to the nut 7 within the barrel 13 is defined by means of a cylindrical thrust sleeve 25 interposed between the flange 8 and the thrust ring 15. The length of the rubber block is such that it is compressed in the inoperative position and the friction at the ends resulting therefrom is sufficient to initiate meshing action. When the block 11 is compressed between the flanges 8 and 9, it transmits torque directly therebetween and also supplements the transmission of torque to the barrel through the friction thrust washer 17 by reason of the frictional engagement of the block within the barrel.

Means for frictionally transmitting torque from the barrel 13 to the nut is preferably provided in the form of a friction ring 26 interposed between the flange 9 on the pinion 2 and the flange 14 of the barrel.

In the operation of this embodiment of the invention, starting with the parts in the positions illustrated in Fig. 1, acceleration of the power shaft 1 by the starting motor causes the nut 7 to be traversed to the right along the threads 5 of shaft 4, which motion is transmitted to the pinion 2 and barrel 13 through the rubber block 11. The meshing movement of the pinion and barrel assembly is limited by the engagement of the friction washer 17 on the thrust ring 15 with the stop member 12. Further movement of the nut 7 compresses the rubber block 11 between the flanges 8 and 9, thereby building up pressure for the transmission of torque directly through the block from the nut flange 8 to pinion flange 9. Torque is also transmitted from the stop member 12 to the thrust ring 15 and from the barrel flange 14 to the pinion flange 9 through the friction washers 17 and 26 respectively. The compression of the block 11 also causes it to frictionally engage the interior of the barrel 13, and the torque so transmitted to the barrel is applied to the pinion through the friction washer 26. The resilient transmission of torque through the block between the nut flange 8 and pinion flange 9 is controlled and damped by the frictional connections referred to which act in the nature of shock absorbers to damp relative torsional oscillations of the nut and pinion.

When the engine starts, the acceleration of the engine member 3 causes the pinion 2 to overrun the power shaft 1 whereby the nut member 7 moves back and relaxes the pressure on the rubber block 11. The nut 7 can then overrun freely, subject only to the light frictional drag caused mainly by the compression of the anti-drift spring 18. The frictional drag between the pinion and barrel assembly may be arranged to be sufficient to cause immediate demeshing of the pinion due to overrunning of the power shaft irrespective of continued energization of the starting motor. In some installations, however, it is preferred to install the rubber block 11 with sufficient clearance in the barrel 13 whereby the frictional drag on overrun of the pinion is quite small and the pinion will stay in mesh with the flywheel gear as long as the starting motor remains energized. In such installations, if the engine should fail to continue self-operative after an initial start, the starting motor will pick up the flywheel and continue to rotate it until a true start is secured.

When the starting motor is deenergized, the deceleration of the power shaft 1 causes traversal of the parts to their idle positions, aided by the slight frictional drag of the overrunning pinion and the anti-drift spring 18. Rebounding of the parts toward meshing position when so thrown out of mesh is prevented by the nut 7 running off the end of the threads 5 and rotating freely on the smooth portion of the shaft 4 until the momentum of the parts is dissipated. Initial entry of the nut 7 into the threads 5 is thereafter brought about by the re-entry spring 21 which thus insures traversal of the parts upon reactuation of the power shaft 1.

The embodiment of the invention illustrated in Figs. 4 and 5 is substantially similar to that illustrated in Figs. 1 to 3, and the corresponding parts are similarly numbered. In this case, however, the pinion flange 9' is splined in the end of the barrel 13 to form a positive driving connection therebetween. As here shown, this splined connection is obtained by means of radial lugs 41 extending into slots 42 in the barrel, the flange being retained in the barrel by means of a split ring 43.

In order to prevent dust caused by wear of the rubber block 11 from entering the threads 5 of shaft 4, which might in course of time impede the traversal of the nut 7, a sleeve 44 is here provided loosely mounted in the free end of the rubber block in telescopic relation with the nut 7 and cooperating with a thrust ring 45 to enclose said block.

An optional form of anchorage for the stop member 12 is also here illustrated comprising a shoulder 46 on the hollow shaft 4, and a set screw 47 is threaded through the stop member and hollow shaft, having a pilot 48 entering the power shaft 1 and locked by a retaining ring 49.

The operation of this embodiment of the invention is in general the same as previously described except that the positive connection between the barrel 13 and pinion flange 9' prevents overrunning of the pinion in the barrel when the engine starts. If the block 11 is assembled in the barrel with initial friction, demeshing of the pinion is then caused to take place immediately upon overrunning of the power shaft by the pinion in the conventional manner.

In the embodiment of the invention illustrated in Figs. 6 and 7, a power shaft 51 has freely journalled thereon a pinion 52 for movement into and out of engagement with a flywheel gear 53 of an engine to be started. A hollow screw shaft 54 is fixed to the power shaft 51 by means of a pin 55 retained by a split ring 56. A nut 57 is threaded on the screw shaft 54 and is yieldably connected to the pinion 52 by means of a cylindrical block 58 of rubber-like material mounted on the nut 57 and engaging a flange member 59 suitably anchored to the pinion 52 and keyed as indicated at 61 in a barrel member 62, being retained therein by a split ring 63. Barrel member 62 surrounds and encloses the parts of the drive and serves to define the meshing position of the pinion 52 by virtue of the engagement of an inturned flange 64 on said barrel with a thrust ring 65 mounted in the end of the barrel and adapted to engage a stop ring 66 fixed in any suitable way on the screw shaft 54 against a shoulder 67 thereof.

A thrust sleeve 68 is interposed in the barrel between the thrust ring 65 and the nut 57, and an anti-drift spring 69 is provided engaging the thrust ring 65 and a thimble 71 mounted on the stop member 66 to normally maintain the parts in idle position.

In this embodiment of the invention, the rubber block 58 is formed with tapering end surfaces conforming to tapered portions 72 and 73 of the nut 57 and flange 59 respectively. The block 58 is also formed with a portion 74 fitting with initial friction in the barrel 62 and a portion 75 having initial clearance within the barrel 62. In this manner, initial actuation of the pinion 52 from the nut 57 is comparatively lightly cushioned, the torque capacity of the connection being built up by compression of the block 58.

In the operation of this embodiment of the invention, engagement of the parts as illustrated in Fig. 6 is brought about by acceleration of the power shaft 51 in the usual manner. Further rotation of power shaft 51 causes the nut 57 to compress the elastic block 58 into frictional engagement with the nut, pinion flange and barrel for transmitting torque therethrough. Torque is also transmitted from the abutment member 66 through the thrust ring 65 to the barrel and thence to the pinion through the keyed connection of the flange in the barrel. A friction washer may be interposed between the abutment member 66 and thrust ring 65, or the thimble 71 may be formed of suitable material to perform the functions of such washer, as illustrated.

When the engine starts, acceleration of the pinion with its associated parts causes the traversal thereof to idle position. When the nut 57 strikes the ends of the threads on the screw shaft 54, the backward rotation of the nut on the screw shaft is arrested. Inasmuch, however, as the pinion and barrel are connected to the nut only through the friction of the block 58, the pinion and barrel continue to overrun until their momentum is dissipated, thus maintaining the nut 57 in its idle position with the assistance of the anti-drift spring 69, and preventing rebounding of the parts toward the flywheel gear.

In the embodiment of the invention illustrated in Figs. 8 to 10, a power shaft 81 has a hollow shaft 82 anchored thereon as by means of a pin 83 retained by a lock ring 84, and a key 85. Shaft 82 is threaded for a portion of its length adjacent one end as indicated at 86, and a nut member 87 is mounted thereon in position to cooperate with said threads but normally maintained on the smooth portion 88 of shaft 82 beyond the end of said threads.

A pinion 89 is freely journalled on power shaft 81 for longitudinal movement into and out of engagement with a flywheel gear 91 of an engine to be started. Means for actuating the pinion 81 from nut 87 are provided comprising a block 92 of rubber-like material cooperating at one end with a flange member 93 fixed in any suitable way to the nut 87 and at the other end with a coupling member 94 journalled on a reduced portion 95 of shaft 82. The coupling member is formed to provide a seat 96 for the free end of the elastic block 92 and is provided with a peripheral flange 97 (Fig. 10) having radial slots 98. A sleeve member 101 anchored as indicated at 102 to the pinion 89 is provided with radial lugs 99 adapted to enter the slots 98 and connect the coupling member and sleeve for rotation in unison.

Means for enclosing and uniting the parts is provided in the form of a barrel member 103 having an inturned flange 104 at one end cooperating frictionally with the flange 93 and provided at its other end with a split ring 105 retaining the end of the sleeve member 101 therein. Means for preventing disengagement of the lugs 99 of the sleeve member from the slots 98 of the coupling member is provided in the form of a thrust sleeve 106 in the barrel surrounding the block 92 and bearing at its ends against the flange 104 and the coupling member 94 respectively.

The meshing position of the pinion 89 is defined by a stop nut 107 threaded on the reduced end of the shaft 82 in position to be engaged by the coupling member 94 when the parts are in operative position.

The parts are normally maintained in idle position as illustrated in Fig. 8 by means of an anti-drift spring 108 interposed between the stop nut 107 and coupling member 94. Means for urging the nut 87 into initial engagement with the threads 86 is provided in the form of a re-entry spring 109 mounted on the reduced portion of the screw shaft, bearing at one end against a shoulder 111 formed by the end of the threaded portion 86 of shaft 82 and at the other end against the coupling member 94.

In the operation of this embodiment of the invention, actuation of the power shaft 81 causes traversal of the nut 87 along the threads 86, which motion is transmitted through the rubber block 92, coupling member 94 and sleeve 101 to the pinion 89 to cause it to mesh with the engine flywheel gear 91. When the coupling member 94 engages the stop nut 107, further motion of the nut 87 causes the rubber block 92 to be compressed between the flange 93 and coupling member, thereby building up an elastic frictional connection for transmission of torque to the pinion. Torque is also transmitted directly from the stop nut 107 to the coupling member, for which purpose a friction washer 112 is preferably interposed therebetween.

When the engine starts, overrunning of the pinion is transmitted back through the rubber block to the nut 87, causing it to traverse back to idle position, drawing the pinion out of mesh, after which the parts overrun freely until their momentum is dissipated. The re-entry spring 109 thereupon causes the nut 87 to enter the threads 86, in which position the parts are maintained by the anti-drift spring 108.

Although certain forms of the invention have been shown and described in detail, it will be understood that other forms are possible and various changes may be made in the design and arrangement of the parts without departing from the spirit of the invention as defined in the claims appended hereto.

What is claimed is:

1. In an engine starter drive, a shaft, a stop member fixed on one end thereof, a driving member mounted on the opposite end thereof, a driven pinion member mounted for longitudinal movement into and out of engagement with a member gear of an engine to be started, means including an elastically deformable transmission member frictionally connecting said driving and driven members, transmitting longitudinal movement of the driving member to the driven member yieldingly to enforce mesh in case of tooth abutment of the pinion member with the engine gear, and means including a barrel member enclosing said driving and transmission members and engaging said stop member and driven member to limit the longitudinal movement of the driven member.

2. In an engine starter drive, a screw shaft, a stop member fixed on one end thereof, a driving member threaded on the opposite end thereof, a driven member mounted for longitudinal movement into and out of engagement with a member of an engine to be started, means including a yielding transmission member frictionally connecting said driving and driven members and yieldingly transmitting longitudinal movement of the driving member to the driven member, and means including a barrel member outside the line of transmission of torque from the driving member to the driven member enclosing the transmission member and cooperating with the stop member to limit the engaging movement of the driven member.

3. In an engine starter drive, a power shaft, a screw shaft fixed thereon, a stop member fixed on one end of the screw shaft, a driving clutch member in the form of a nut threaded on the other end thereof, a pinion slidably mounted on the power shaft for movement into and out of engagement with a member of an engine to be started, means including a block of elastic material frictionally connecting the clutch member and pinion for rotation and longitudinal movement in unison, and means including a barrel enclosing the drive and engaging the stop member and pinion to limit the travel of the pinion.

4. In an engine starter drive, a power shaft, a hollow shaft fixed thereon, an abutment fixed on the hollow shaft, a pinion slidably mounted on the power shaft for movement into and out of engagement with a member of an engine to be started, means including a barrel cooperating with the abutment and the pinion to limit the travel of the pinion, and means including a member having an inclined connection with the hollow shaft and a block of elastic material actuated thereby, for resiliently driving the pinion from the hollow shaft, said block forming the sole connection between said member and pinion.

5. In an engine starter drive, a power shaft, a screw shaft fixed thereon, an abutment fixed on the screw shaft, a pinion slidably mounted on the power shaft for movement into and out of engagement with a member of an engine to be started, means including a barrel enclosing the screw shaft cooperating with the abutment and the pinion to limit the travel of the pinion, and means including a nut threaded on the screw shaft and a cylinder of rubber-like material actuated thereby for transmitting longitudinal movement and rotation to the pinion and forming the sole connection between the nut and pinion.

6. In an engine starter drive, a power shaft, a screw shaft fixed thereon, a pinion slidably mounted on the power shaft for movement into and out of engagement with a member of an engine to be started, a nut threaded on the screw shaft, means including a cylinder of rubber-like material surrounding the nut and resiliently traversing and rotating the pinion therefrom, and means including a barrel member surrounding the cylinder, forming an auxiliary frictional driving connection between the power shaft and pinion established after engagement of the pinion with the engine member.

7. In an engine starter drive, a power shaft, a pinion slidably mounted thereon for movement into and out of engagement with a member of an engine to be started, means including a cylinder of rubber-like material surrounding the power shaft and resiliently traversing and rotating the pinion thereon and therewith, and means including a barrel member surrounding the cylinder, limiting the traversal of the pinion, and providing an auxiliary driving connection between the power shaft and pinion.

8. In an engine starter drive, a power shaft, a pinion slidably mounted thereon for movement into and out of engagement with a member of an engine to be started, means including a cylinder of rubber-like material surrounding the power shaft and resiliently traversing and rotating the pinion thereon and therewith, and means including a barrel member enclosing the pinion actuating means and an abutment member fixed to the power shaft, to limit the engaging movement of the pinion and to provide an auxiliary connection for transmitting rotation from the power shaft to the pinion.

9. In an engine starter drive, a power shaft, a pinion slidably mounted thereon for movement into and out of engagement with a member of an engine to be started, means including a block of rubber-like material actuated by acceleration of the power shaft to slide the pinion into engagement with the engine member, and means including a barrel member rotated by the power shaft limiting the engaging movement of the pinion and comprising a frictional clutch connection for rotating the pinion from the barrel member.

10. In an engine starter drive, a power shaft, a pinion slidably mounted thereon for movement into and out of engagement with a member of an engine to be started, means including a block of rubber-like material actuated by acceleration of the power shaft to slide the pinion into engagement with the engine member, an abutment member fixed to the power shaft, and means enclosing the sliding means limiting the engaging movement of the pinion and frictionally cooperating with the abutment member and pinion to transmit torque from the power shaft to the pinion.

11. In an engine starter drive, a power shaft, a pinion freely mounted thereon for movement into and out of engagement with a member of an engine to be started, means including a block of elastically deformable material operative in response to acceleration of the power shaft to move the pinion into engagement with the engine member, an abutment member fixed to the power shaft, means including a barrel member cooperating with the abutment member and pinion to limit the traversal of the pinion and transmit rotation thereto, and yielding means in the barrel member cooperating with the abutment for normally maintaining the pinion in idle position.

YOUSTON SEKELLA.